United States Patent
Miyake et al.

(10) Patent No.: US 6,756,432 B2
(45) Date of Patent: Jun. 29, 2004

(54) POLYBUTADIENE COMPOSITION

(75) Inventors: Kunihito Miyake, Yamatokoriyama (JP); Mutsuko Higo, Kobe (JP); Kanako Fukuda, Sakai (JP); Hironobu Iyama, Takatsuki (JP)

(73) Assignee: Sumitomo Chemical Company, Limited, Osaka (JP)

(*) Notice: Subject to any disclaimer, the term of this patent is extended or adjusted under 35 U.S.C. 154(b) by 153 days.

(21) Appl. No.: 10/022,918

(22) Filed: Dec. 20, 2001

(65) Prior Publication Data

US 2003/0153655 A1 Aug. 14, 2003

(30) Foreign Application Priority Data

Dec. 22, 2000 (JP) ........................... 2000-390710
Dec. 22, 2000 (JP) ........................... 2000-390711
Dec. 22, 2000 (JP) ........................... 2000-390712

(51) Int. Cl.$^7$ .............................................. C08K 5/15
(52) U.S. Cl. ...................................................... 524/110
(58) Field of Search ............................................ 524/110

(56) References Cited

U.S. PATENT DOCUMENTS

| | | |
|---|---|---|
| 4,632,956 A | 12/1986 | Kress et al. |
| 5,665,799 A | 9/1997 | Inui et al. |
| 6,465,548 B1 * | 10/2002 | Inoue et al. ............... 524/110 |

FOREIGN PATENT DOCUMENTS

| | | |
|---|---|---|
| EP | 1 024 165 A1 | 2/2000 |
| WO | WO 99/54394 | 10/1999 |
| WO | WO 00/00540 | 6/2000 |

* cited by examiner

*Primary Examiner*—Kriellion A. Sanders
(74) *Attorney, Agent, or Firm*—Birch, Stewart, Kolasch & Birch, LLP

(57) ABSTRACT

There are disclosed a polybutadiene composition comprising:
  a polybutadiene type polymer, and
    at least one compound selected from
      a compound of formula (I-1):

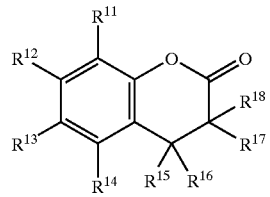

or a compound of formula (I-2):

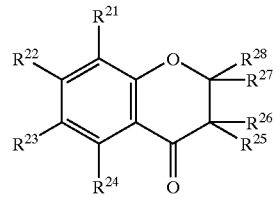

wherein $R^{11}$ to $R^{28}$ are the same or different and independently represent a hydrogen atom, an alkyl group, or the like; or
  a compound of formula (II):

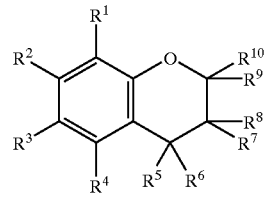

wherein $R^1$ to $R^{10}$ independently represent a hydrogen atom, an alkyl group, or the like; or
  a styrene-butadiene copolymer, and a benzoin compound; and an article molded therefrom, and processes for producing the composition and the molded article.

17 Claims, No Drawings

POLYBUTADIENE COMPOSITION

FIELD OF THE INVENTION

The present invention relates to polybutadiene compositions.

BACKGROUND OF THE INVENTION

Polybutadiene polymers having butadiene units as their polymerization unit have been widely used for the production of various molded articles, since they exhibit same strength and elastic property as vulcanized elastomers. However, polybutadiene polymers are apt to form gelled product by heat-melting, which led to bad appearance of molded articles produced therefrom.

SUMMARY OF THE INVENTION

According to the present invention, formation of gelled products is efficiently prevented and the composition of the present invention is suitably used for the production of molded articles.

The present invention provides:

a polybutadiene composition comprising:
(a) (a-1) a polybutadiene type polymer, and
  (a-2) at least one compound selected from
  a compound of formula (I-1):

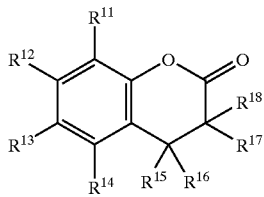

or a compound of formula (I-2):

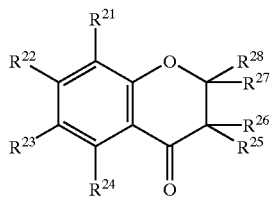

wherein $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, and $R^{28}$ are the same or different and independently represent a hydrogen atom, an alkyl group, an alkoxy group, a benzyloxy group, a hydroxy group, a carboxyl group, an acyl group, an acyloxy group, an alkoxycarbonyl group, or a benzyloxycarbonyl group; or (b) (b-1) a polybutadiene type polymer, and (b-2) a compound of formula (II):

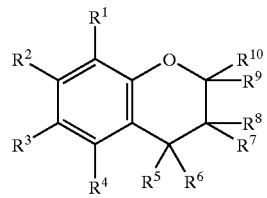

wherein $R^1$, $R^2$ and $R^4$ independently represent a hydrogen atom, or an alkyl group,
  $R^3$ represents a hydrogen atom, an alkyl group, an alkoxy group, a hydroxy group, or an acetyl group,
  $R^5$, $R^6$, $R^7$ and $R^8$ independently represent a hydrogen atom, an alkyl group, or a phenyl group which may be substituted with an alkyl group, and
  $R^9$ and $R^{10}$ independently represent a hydrogen atom, an alkyl group, or an alkenyl group; or
(c) (c-1) a styrene-butadiene copolymer, and
(c-2) a benzoin compound;
an article molded from the composition as described above, and processes for producing the composition and the article.

DETAILED DESCRIPTION OF THE INVENTION

A description will be made to a first aspect of the polybutadiene composition, which comprises
(a-1) a polybutadiene type polymer, and
(a-2) at least one compound selected from a compound of formula (I-1) or a compound of formula (I-2).

The polybutadiene polymer that may be used in the present invention means a polybutadiene polymer comprising butadiene, as a monomer unit, or a copolymer comprising butadiene and another monomer.

Examples of the polybutadiene type polymer described above include, for example, polybutadiene, styrene-butadiene copolymers, acrylonitrile-butadiene copolymers, acrylonitrile-butadiene-styrene copolymers, styrene-butadiene block copolymers and high-impact polystyrenes. These butadiene polymers can be produced by a conventional polymerization method such as a solution polymerization method, an emulsion polymerization method, a bulk polymerization method or the like. The polybutadiene polymer may be either a resin or a rubber.

The polybutadiene may be a polybutadiene rubber produced by a solution polymerization method or an emulsion polymerization method.

Preferred polybutadiene type polymer in (a) is polybutadiene polymer, styrene-butadiene copolymer, acrylonitrile-butadiene copolymer, or styrene-butadiene block copolymer.

More preferred polybutadiene type polymer in (a) is styrene-butadiene block copolymer.

$R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, and $R^{28}$ groups in the compounds of formula (I-1) and formula (I-2) will be explained below.

Examples of the alkyl group include, for example, an alkyl group having about 1 to 6 carbon atoms.

Specific examples thereof include, for example, a methyl group, an ethyl group, a n-propyl group, an isopropyl group, a n-butyl group, an isobutyl group, a sec-butyl group, a t-butyl group, a 2-ethylbutyl group, a n-pentyl group, a 1-methylpentyl group, a 1,3-dimethylbutyl group, a n-hexyl group, a cyclopentyl group, a cyclohexyl group and the like.

Examples of the alkoxy group include, for example, an alkoxy group having about 1 to 6 carbon atoms.

Specific examples thereof include, for example, a methoxy group, an ethoxy group, a n-propoxy group, an isopropoxy group, a n-butoxy group, an isobutoxy group, a sec-butoxuy group, a t-butoxy group, a 2-ethylbutoxy group, a n-pentyloxy group, a 1-methylpentyloxy group, a 1,3-dimethylbutyloxy group, a n-hexyloxy group, a cyclopentyloxy group, a cyclohexyloxy group and the like.

Examples of the acyl group include, for example, an alkanoyl group having about 1 to 6 carbon atoms, a benzoyl group and the like.

Specific examples thereof include, for example, an acetyl group, a propoinyl group, an isopropionyl group, a butyryl group, an isobutyryl group, a valeryl group, an isovarelyl group, a pivaroyl group, a hexanoyl group, a cyclopentylcarbonyl group and the like.

Examples of the acyloxy group include, for example, an acyloxy group having about 1 to 6 carbon atoms.

Specific examples thereof include, for example, an acetyloxy group, a propoinyloxy group, an isopropionyloxy group, a butyryloxy group, an isobutyryloxy group, a valeryloxy group, an isovarelyloxy group, a pivaroyloxy group, a hexanoyloxy group, a cyclopentylcarbonyloxy group and the like.

Examples of the alkoxycarbonyl group include, for example, an alkoxycarbonyl group having about 1 to 6 carbon atoms. Specific examples thereof include, for example, a methoxycarbonyl group, an ethoxycarbonyl group, a n-propoxycarbonyl group, an isopropoxycarbonyl group, a n-butoxycarbonyl group, an isobutoxycarbonyl group, a sec-butoxuycarbonyl group, a t-butoxycarbonyl group, a n-pentyloxycarbonyl group, a cyclopentyloxycarbonyl group, and the like.

Preferred compounds of formula (I-1) are a compound of formula (I-1), wherein $R^{15}$, $R^{16}$, $R^{17}$ and $R^{18}$ are a hydrogen atom.

Specific examples of the compound of formula (I-1) include, for example, 2-chromanone, 3,4-dihydrocoumarine, 5-methyl-3,4-dihydrocoumarine, 6-methyl-3,4-dihydrocoumarine, 7-methyl-3,4-dihydrocoumarine, 8-methyl-3,4-dihydrocoumarine, 5-ethyl-3,4-dihydrocoumarine, 6-ethyl-3,4-dihydrocoumarine, 7-ethyl-3,4-dihydrocoumarine, 8-ethyl-3,4-dihydrocoumarine, 5,6-dimethyl-3,4-dihydrocoumarine, 5,7-dimethyl-3,4-dihydrocoumarine, 5,8-dimethyl-3,4-dihydrocoumarine, 6,7-dimethyl-3,4-dihydrocoumarine, 6,8-dimethyl-3,4-dihydrocoumarine, 7,8-dimethyl-3,4-dihydrocoumarine, 5-methyl-6-ethyl-3,4-dihydrocoumarine, 5-methyl-7-ethyl-3,4-dihydrocoumarine, 5-methyl-8-ethyl-3,4-dihydrocoumarine, 6-methyl-7-ethyl-3,4-dihydrocoumarine, 6-methyl-8-ethyl-3,4-dihydrocoumarine, 7-methyl-8-ethyl-3,4-dihydrocoumarine, 5-ethyl-6-methyl-3,4-dihydrocoumarine, 5-ethyl-7-methyl-3,4-dihydrocoumarine, 5-ethyl-8-methyl-3,4-dihydrocoumarine, 6-ethyl-7-methyl-3,4-dihydrocoumarine, 6-ethyl-8-methyl-3,4-dihydrocoumarine, 7-ethyl-8-methyl-3,4-dihydrocoumarine, and the like.

Specific examples of the compound of formula (I-2) include, for example, 4-chromanone, 6-methoxy-4-chromanone, 6-ethoxy-4-chromanone, 6-benzyloxy-4-chromanone, 6-hydroxy-4-chromanone, 6-carboxy-4-chromanone, 6-acetyl-4-chromanone, 6-benzoyl-4-chromanone, 6-acetoxy-4-chromanone, 6-methoxycarbonyl-4-chromanone, 6-tert-butoxycarbonyl-4-chromanone, 6-benzyloxycarbonyl-4-chromanone, 8-ethyl-4-chromanone, 8-phenyl-4-chromanone, 8-cyclohexyloxy-4-chromanone, 8-benzyloxy-4-chromanone, 8-hydroxy-4-chromanone, 8-carboxy-4-chromanone, 8-acetyl-4-hydroxychromanone, 8-benzoyl-4-chromanone, 8-acetoxy-4-hydroxychromanone, 2-phenyl-4-chromanone, 2-isopropyl-4-chromanone, 2-methyl-2-benzyl-4-chromanone, 2-hydroxybutyl-4-chromanone, and the like.

The present polybutadiene composition contains an effective amount of at least one compound of formula (I-1) or (I-2).

The polybutadiene composition of the present invention preferably contains at least one compound selected from the compound of formula (I-1) or (I-2) in an amount of 0.01 part by weight or more, preferably 0.01 part by weight or more, per 100 parts by weight of the polybutadiene type polymer. The upper limit of the amount of the compound of formula (I) is usually 10 parts by weight or less, preferably 5 part by weight or less per 100 parts by weight of the polybutadiene polymer.

Next, a description will be made to a second aspect of the polybutadiene composition, which comprises (b-1) a polybutadiene type polymer, and (b-2) a compound of formula (II).

The polybutadiene polymer that may be used in the second aspect of the present invention is the same as described above for the first aspect of the present invention.

Preferred polybutadiene type polymer in (b) is polybutadiene polymer, styrene-butadiene copolymer, acrylonitrile-butadiene copolymer, or styrene-butadiene block copolymer.

More preferred polybutadiene type polymer in (b) is styrene-butadiene block copolymer.

Substituent groups $R^1$ to $R^8$ in the compound of formula (II) will be explained below.

Examples of the alkyl group represented by $R^1$, $R^2$, $R^4$, $R^5$, $R^6$, $R^7$, and $R^8$ include, for example, an alkyl group having about 1 to 6 carbon atoms.

Specific examples thereof include, for example, a methyl group, an ethyl group, a n-propyl group, an isopropyl group, a n-butyl group, an isobutyl group, a sec-butyl group, a t-butyl group, a 2-ethylbutyl group, a n-pentyl group, a 1-methylpentyl group, a 1,3-dimethylbutyl group, a n-hexyl group, a n-heptyl group, a 1-methylheptyl group, a 3-methylheptyl group, a n-octyl group, a 2-ethylhexyl group, a 1,1,3-trimethyl hexyl group, a 1,1,3,3-tetramethylpentyl group, a nonyl group, a decyl group, a undecyl group, a 1-methylundecyl group, a dodecyl group, a 1,3,3,5,5-hexamethylhexyl group, a tridecyl group, a tetradecyl group, a pentadecyl group, a hexadecyl group, a heptadecyl group, a octadecyl group and the like.

Examples of the alkyl group represented by $R^9$ or $R^{10}$ include, for example, a (C1–C18)alkyl group. Specific examples thereof include, for example, a methyl group, an ethyl group, a n-propyl group, an isopropyl group, a n-butyl group, an isobutyl group, a sec-butyl group, a t-butyl group, a 2-ethylbutyl group, a n-pentyl group, a 1-methylpentyl group, a 1,3-dimethylbutyl group, a n-hexyl group, a cyclopentyl group, a cyclohexyl group and the like.

Examples of the alkoxy group represented by $R^3$ include, for example, a methoxy group, an ethoxy group, a n-propoxy group, an isopropoxy group, a n-butoxy group, an isobutoxy group, a sec-butoxuy group, a t-butoxy group, a 2-ethylbutoxy group, a n-pentyloxy group, a 1-methylpentyloxy group, a 1,3-dimethylbutyloxy group, a n-hexyloxy group, a cyclopentyloxy group, a cyclohexyloxy group and the like.

Examples of the phenyl group which may be substituted with an alkyl group (e.g, C1–C3 alkyl group such as methyl, ethyl, propyl or the like) represented by $R^5$, $R^6$, $R^7$ and $R^8$ include, for example, a phenyl group, o-,m-,p-methylphenyl groups, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2-methyl-6-ethylphenyl group, a 4-t-butylphenyl group, a 2-ethylphenyl group, a 2,6-diethylphenyl group or the like.

Examples of the alkenyl group represented by $R^9$ and $R^{10}$ include, for example, a (C2–C18)alkenyl group such as a 4-methylpent-3-enyl group, 4,8,12-trimethyl-3,7,11-tridecatrienyl group or the like.

Compounds of formula (II), wherein $R^3$ is a hydrogen atom or a hydroxy group are preferred. More preferred compounds are compounds of formula (II), wherein $R^1$, $R^2$, $R^4$, $R^9$, and $R^{10}$ represent a methyl group and $R^5$, $R^6$, $R^7$ and $R^8$ represent a hydrogen atom.

Specific examples of the compound of formula (II) include, for example, 2,2,5,7,8-pentamethyl-6-hydroxychromane, 2,2,5,7-tetramethyl-6-hydroxychromane, 2,2,7-trimethyl-6-hydroxychromane, 2,2,8-trimethyl-6-hydroxychromane, 2,2-dimethyl-6-hydroxychromane, 2,2,5-trimethyl-7-t-butyl-6-hydroxychromane, 2,2,5-trimethyl-8-t-butyl-6-hydroxychromane, 2,2,7,8-tetramethyl-6-hydroxychromane, 2,2,5,8-tetramethyl-6-hydroxychromane, 2,2-dimethyl-7-t-butyl-6-hydroxychromane, 4-isopropyl-2,2,5-trimethyl-7-t-butyl-6-hydroxychromane, 4-isopropyl-2,2-dimethyl-7-t-butyl-6-hydroxychromane, 2,2-dimethyl-5-t-butyl-6-hydroxychromane, 2,5,7,8-tetramethyl-2-(4-methylpent-3-enyl)-5-hydroxychromane, 2,5-dimethyl-8-t-butyl-2-(4-methylpent-3-enyl)-6-hydroxychromane, 2-methyl-2-(4-methylpent-3-enyl)-6-hydroxychromane, 2,2,5-trimethyl-6-hydroxychromane, α-tocopherol, β-tocopherol, γ-tocopherol, δ-tocopherol, ε-tocopherol, ζ1-tocopherol, ζ2-tocopherol, η-tocopherol, tocol, 2,2,4-trimethyl-4-(hydroxyphenyl)chromane, 2,2,4,6-tetramethyl-4-(3,5-dimethyl-4-hydroxyphenyl)chromane, 2,3,4-trimethyl-2-ethyl-4-(3-nonyl-4-hydroxyphenyl)-7-nonylchromane, 2,3,4-trimethyl-4-(3,5-diethyl-4-hydroxyphenyl)-6-ethylchromane, 2,2,4,6,8-pentamethyl-4-(3,5-dimethyl-4-hydroxyphenyl)chromane, 2,2,4-triethyl-3-methyl-4-(4-hydroxyphenyl)chromane, 2,2,3-trimethyl-3-(4-hydroxyphenyl)chromane, 2,2,3,6-tetramethyl-3-(3,5-dimethyl-4-hydroxtphenyl)chromane, 2,3,4-trimethyl-2-ethyl-3-(3-nonyl-4-hydroxyphenyl)-7-nonylchromane, 2,2,3-trimethyl-3-(3,5-diethyl-4-hydroxtphenyl)-6-ethylchromane, 2,2,3,6,8-pentamethyl-3-(3,5-dimethyl-4-hydroxyphenyl)chromane, 2,2,5-triethyl-3-methyl-3-(4-hydroxyphenyl)chromane, 2,4,4,6-tetramethyl-2-(3,5-dimethyl-4-hydroxyphenyl)chromane, 2,4,4-triethyl-2-(4-hydroxyphenyl)chromane, 2,3,4-trimethyl-4-ethyl-2-(3,5-dimethyl-4-hydroxyphenyl)-7-nonylchromane, 2,4,4-trimethyl-2-(3,5-diethyl-4-hydroxyphenyl)-6-ethylchromane, 2,4,4,7,8-pentamethyl-2-(3,5-dimethyl-4-hydroxyphenyl)-6-ethylchromane, 2,2,5,7,8-pentamethylchromane, and the like.

The polybutadiene composition of the second aspect of the present invention usually contains an effective amount of the compound of formula (II).

The amount of the compound of formula (II) is preferably 0.001 part by weight or more per 100 parts by weight of the polybutadiene polymer. Any amount of the compound of formula (II) may be used unless subsequent melting and molding of the composition is not adversely affected. The upper limit of the amount of the compound of formula (II) is preferably 10 parts or less, more preferably 5 parts or less per 100 parts by weight of the butadiene polymer.

A description will be made to a third aspect of the polybutadiene composition, which comprises (c-1) a styrene-butadiene copolymer, and (c-2) a benzoin compound.

The styrene-butadiene copolymer is preferably a styrene-butadiene block copolymer.

Examples of the benzoin compound include, a compound of formula (III):

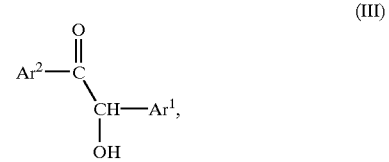

(III)

wherein $Ar^1$ and $Ar^2$ are the same or different and independently represent a phenyl group which may be substituted with at least one group selected from the group consisting of a halogen atom, a hydroxy group, an alkyl group, an alkoxy group, an alkoxyalkyl group, an aryl group, an arylalkyl group, an aryloxy group, an alkylcarbonyloxy group, an alkylsulfonyloxy group, an arylcarbonyloxy group, and a group of formula: —COOQ, wherein Q represents a hydrogen atom or an alkyl group, and two adjacent substituent groups on the phenyl group together with the carbon atoms to which they are bonded may form a benzene ring or rings.

A description will be made to the substituent groups on the phenyl groups as below.

Examples of the halogen atom include a fluorine atom, a chlroline atom, a bromine atom, an iodine atom.

Examples of the alkyl group include a (C1–C8)alkyl group. Specific examples thereof include, for example, a heptyl group, and octyl group in addition to those specified (C1–C6)alkyl groups in the first aspect of the invention.

Examples of the alkoxy group include, for example, a heptyloxy group, an octyloxy group, in addition to those specified (C1–C6) alkoxy groups in the first aspect of the invention, Examples of the aryl group include, for example, a phenyl group, a naphthyl group, anthracenyl group and the like.

Examples of the aryloxy group include, for example, a phenoxy group, a naphthyloxy group, anthracenyloxy group and the like.

Examples of the arylalkyl group include, a benzyl group, 1-, or 2-phenethyl group, naphthylmethyl group and the like.

Examples of the alkylcarbonyloxy group include those as specified in the first aspect of the invention.

Examples of the alkylsulfonyloxy group include, for example, methylsulfonyloxy group and the like.

Examples of the arylcarbonyloxy group include, for example, a phenylcarbonyloxy group, a naphthylcarbonyloxy group, an anthracenylcarbonyloxy group and the like Examples of the alkyl group represented by Q include, for example, the same (C1–C6)alkyl group as described in the first aspect of the invention.

Examples of the $Ar^1$ and $Ar^2$ groups, when two adjacent substituent groups on the phenyl group together with the carbon atoms to which they are bonded form a benzene ring or rings, include, for example, a naphthalene or anthracene.

Preferred benzoin compounds include, for example, a compound of formula (III), wherein $Ar^1$ and $Ar^2$ are the same or different and independently represent a phenyl group, which may be substituted with an alkyl group, an alkoxy group or an alkoxyalkyl group.

Examples of the alkyl group include, for example, a (C1–C6)alkyl group. Specific examples thereof include, for example, those specific alkyl groups as described in the first aspect of the invention.

Examples of the alkoxy group include, for example, a (C1–C6)alkoxy group. Specific examples thereof include, for example, those alkoxy groups as described in the first aspect of the invention.

Examples of the alkoxyalkoxy group include, for example, an alkoxyalkoxy group having 2 to 6 carbon atoms. Specific examples thereof include methoxymethoxy group or the like.

Specific examples of the benzoin compound include, for example, 3'-hydroxybenzoin, 4,4'-dimethoxybenzoin, 4,4'-bis(methoxymethoxy)benzoin, 4'-methylbenzoin, 4'-ethylbenzoin, 4'-n-propylbenzoin, 4'-isopropylbenzoin, 4'-n-butylbenzoin, 4'-sec-butylbenzoin, 4'-t-butylbenzoin, 4'-amylbenzoin, 4'-hexylbenzoin, 4'-heptylbenzoin, 4'-octylbenzoin, 4'-fluorobenzoin, 4'-chlorobenzoin, 4'-bromobenzoin, 4',4-difluorobenzoin, 4',4-dichlorobenzoin, 4',4-dibromobenzoin, 4-methoxybenzoin, 4'-phenoxybenzoin, 4'-phenylbenzoin, 4'-cyclohexylbenzoin, 2',4',6'-trimethylbenzoin, 9,9'-anthroin, 2-hydroxy-1,2-di-(1-naphthyl)ethanone and the like.

The polybutadiene composition of the third aspect of the present invention usually contains an effective amount of the benzoin compound of formula (III). The amount of the benzoin compound is preferably 0.01 part, more preferably 0.05 part by weight or more per 100 parts by weight of the styrene-butadiene copolymer, and preferably 10 parts by weight, more preferably 5 parts by weight per 100 parts by weight of the styrene-butadiene copolymer.

The polybutadiene compositions of the present invention may optionally comprise an antioxidant such as phenol antioxidants, sulfur antioxidants, phosphorous antioxidant or the like.

Examples of the phenol antioxidant include, for example, (1) alkylated monophenols such as 2,6-di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6'-(1'-methylheptadecyl-1'-yl)phenol, 2,4-dimethyl-6-(1'-methyltridecyl-1'-yl)phenol and a mixture thereof;

(2) alkylthiomethylphenols such as 2,4-dioctylthiomethyl-6-t-butylphenol, 2,4-dioctylthiomethyl-6-methylphenol, 2,4-dioctylthiomethyl-6-ethylphenol, 2,6-didodecylthiomethyl-4-nonylphenol and a mixture thereof;

(3) hydroquinones and alkylated hydroquinones such as 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyphenyl stearate, bis(3,5-di-t-butyl-4-hydroxyphenyl)adipate and a mixture thereof;

(4) hydroxylated thiodiphenyl ethers such as 2,2'-thiobis(6-t-butylphenol), 2,2'-thiobis(4-methyl-6-t-butylphenol), 2,2'-thiobis(4-octylphenol), 4,4'-thiobis(3-methyl-6-t-butylphenol), 4,4'-thiobis(2-methyl-6-t-butylphenol), 4,4'-thiobis(3,6-di-t-amylphenol), 4,4'-(2,6-dimethyl-4-hydroxyphenyl)disulfide and the like;

(5) alkylidenebisphenols and derivative thereof such as 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol]], 2,2'-methylenebis(4-methyl-6-cyclohexylphenol), 2,2'-methylenebis(4-methyl-6-nonylphenol), 2,2'-methylenebis(4,6-di-t-butylphenol)], 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 2,6-bis[3-t-butyl-5-methyl-2-hydroxybenzyl]-4-methylphenol, 1,1,3-tris(5-t-butyl-4-hydroxy-2-methylphenyl)butane, 1,1-bis(5-t-butyl-4-hydroxy-2-methylphenyl)-3-n-dodecylmercaptobutane, bis[3,3-bis-3'-t-butyl-4'-hydroxyphenyl]butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl]tere phthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecylmercaptobutane, 1,1,5,5-tetra(5-t-butyl-4-hydroxy-2-methylphenyl)pentane, 2-t-butyl-6-(3'-t-butyl-5'-methyl-2'-hydroxybenzyl)-4-methylphenyl-acrylate, 2,4-di-t-pentyl-6-[1-(2-hydroxy-3,5-di-t-pentylphenyl)ethyl]phenyl acrylate and a mixture thereof;

(6) O-, N- and S-benzyl derivatives such as 3,5,3',5'-tetra-t-butyl-4,4'-dihydroxydibenzyl ether, octadodecyl-4-hydroxy-3,5-dimethylbenzylmercapto acetate, tris(3,5-di-t-butyl-4-hydroxybenzyl)amine, bis(4-t-butyl-3-hydroxy-2,6-dimethylbenzyl)dithioterephthalate, bis(3,5-di-t-butyl-4-hydroxybenzyl)sulfide, isooctyl-3,5-di-t-butyl-4-hydroxybenzylmercapto acetate and a mixture thereof;

(7) hydroxybenzylated malonate derivatives such as dioctadecyl-2,2-bis(3,5-di-t-butyl-2-hydroxybenzyl)malonate, dioctadecyl-2-(3-t-butyl-4-hydroxy-5-methylbenzyl)malonate, didodecylmercaptoethyl-2,2-bis(3,5-di-t-butyl-4-hydroxybenzyl)malonate, bis[4-(1,1,3,3-tetramethylbutyl)phenyl]-2,2-bis(3,5-di-t-butyl-4-hydroxybenzyl)malonate and a mixture thereof;

(8) aromatic hydroxybenzyl derivatives such as 1,3,5-trimethyl-2,4,6-tris(3,5-di-t-butyl-4-hydroxybenzyl)benzene, 1,4-bis(3,5-di-t-butyl-4-hydroxybenzyl)-2,3,5,6-tetramethylbenzene, 2,4,6-tris(3,5-t-butyl-4-hydroxybenzyl)phenol and a mixture thereof;

(9) triazine derivatives 2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butylphenoxy)-1,3,5-triazine, 2,4,6-tris(3,5-di-t-butyl- 4-hydroxy)-1,3,5-triazine, tris(4-t-butyl-3-hydroxy-2, 6-dimethylbenzyl isocyanurate, tris(3,5-di-t-butyl-4-hydroxybenzyl)isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl)isocyanurate, tris[2-(3',5'-di-t-butyl-4'-hydroxycinnamoyloxy)ethyl]-isocyanurate and a mixture thereof;

(10) benzyl phosphonate derivatives such as dimethyl-3,5-di-t-butyl-4-hydroxybenzyl phosphonate, diethyl-3,5-di-t-butyl-4-hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calcium salt of 3,5-di-t-butyl-4-hydroxybenzyl phosphonic acid monoester and a mixture thereof;

(11) acylaminophenol derivatives such as anilide 4-hydroxylaurate, anilide 4-hydroxystearate, octyl-N-(3,5-di-t-butyl-4-hydroxyphenyl)carbanate and a mixture thereof;

(12) esters of β-(3,5-di-t-butyl-4-hydroxyphenyl) propionic acid and the following monohydric or polyhydric alcohol: methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof;

(13) esters of β-(5-t-butyl-4-hydroxy-3-methylphenyl) propionic acid and the following monohydric or polyhydric alcohol: methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof;

(14) esters of β-(3,5-dicyclohexyl-4-hydroxyphenyl) propionic acid and the following monohydric or polyhydric alcohol: methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof;

(15) esters of 3,5-di-t-butyl-4-hydroxyphenylacetic acid and the following monohydric or polyhydric alcohol: methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof; and

(16) amides of β-(3,5-di-t-butyl-4-hydroxyphenyl) propionic acid such as N,N'-bis[3-(3',5'-di-t-butyl-4'-hydroxyphenyl)propionyl]hydrazine, N,N'-bis[3-(3',5'-di-t-butyl-4'-hydroxyphenyl)propionyl] hexamethylenediamine, N,N'-bis[3-(3',5'-di-t-butyl-4'-hydroxyphenyl)propionyl]-trimethylenediamine and a mixture thereof.

Phenol antioxidants such as those mentioned above can be used singly or as a combination of two or more of them.

Examples of the phosphorous antioxidant include: triphenyl phosphite, tris(nonylphenyl)phosphite, tris(2,4-di-t-butylphenyl)phosphite, trilauryl phosphite, trioctadecyl phosphite, distearyl pentaerythritol diphosphite, diisodecyl pentaerythritol diphosphite, bis(2,4-di-t-butylphenyl) pentaerythritol diphosphite, bis(2,4-di-t-butyl-6-methylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis (2,4,6-tri-t-butylphenyl)pentaerythritol diphosphate, tristearyl sorbitol triphosphite, tetrakis(2,4-di-t-butylphenyl)-4,4'-diphenylene diphosphite, 2,2'-methylenebis(4,6-di-t-butylphenyl)2-ethylhexyl phosphite, 2,2'-ethylidenebis(4,6-di-t-butylphenyl)fluoro phosphite, bis (2,4-di-t-butyl-6-methylphenyl)ethyl phosphite, bis(2,4-di-t-butyl-6-methylphenyl)methyl phosphite, (2,4,6-tri-t-butylphenyl)-5-ethyl-5-butyl-1,3,2-oxaphosphorinane, 2,2',2"-nitrilo[triethyl-tris(3,3',5,5'-tetra-t-butyl-1,1'-biphenyl-2,2'-diyl)phosphite and a mixture thereof.

Phosphorous antioxidants such as those mentioned above can be used singly or as a combination of two or more of them.

Examples of the Sulfur Antioxidant Include:
dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetraylkis(3-lauryl thiopropionate) and a mixture thereof.

Sulfur antioxidants described above can be used singly or as a combination of two or more of them.

The antioxidants as described above may be comprised in an amount of 0.001 part by weight or more in the polybutadiene composition of the present invention based on 100 parts by weight of the polybutadiene composition. From economical view point, the amount is preferably 10 parts by weight or less based on 100 parts by weight of the polybutadiene composition.

The polybutadiene composition of the present invention may further comprise other additives such as an ultraviolet absorber, a photostabilizer, a hydroxylamine, a metal inactivating agent, a lubricant, a metal soap, a nucleating agent, an antistatic agent, a flame retardant, a pigment, a filler and the like.

Examples of the Ultraviolet Absorbers Include
(1) salicylate derivatives such as phenyl salicylate, 4-t-butylphenyl salicylate, 2,4-di-t-butylphenyl 3',5'-di-t-butyl-4'-hydroxybenzoate, 4-octylphenyl salicylate, bis (4-t-butylbenzoyl)resorcinol, benzoylresorcinol, hexadecyl 3',5'-di-t-butyl-4'-hydroxybenzoate, octadecyl 3',5'-di-t-butyl-4'-hydroxybenzoate, 2-methyl-4,6-di-t-butylphenyl 3',5'-di-t-butyl-4'-hydroxybenzoate and a mixture thereof;

(2) 2-hydroxybenzophenone derivatives such as 2,4-dihydroxybenzophenone, 2-hydroxy-4-methoxybenzophenone, 2-hydroxy-4-octoxybenzophenone, 2,2'-dihydroxy-4- methoxybenzophenone, bis(5-benzoyl-4-hydroxy-2-methoxyphenyl)methane, 2,2',4,4'-tetrahydroxybenzophenone and a mixture thereof; and (3) 2-(2'-hydroxyphenyl)benzotriazoles such as 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxypheny)benzotriazole, 2-(3',5'-di-t-amyl-2'-hydroxyphenyl)benzotriazole, 2-[2'-hydroxy-3',5'-bis(α, α-dimethylbenzyl)phenyl]-2H-benzotriazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy)carbonylethyl]-2'-hydroxyphenyl]-5-chlorobenzotriazole 2-[3'-t-butyl-2'-hydroxy-5'-(2-methoxycarbonylethyl)-phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl]benzotriazole, 2-[3'-t-butyl-2'-hydroxy-5'-[2-(2-ethylhexyloxy)carbonyl-ethyl]phenyl]-benzotriazole, 2-[2-hydroxy-3-(3,4,5,6-tetrahydrophthalimidemethyl)-5-methylphenyl]-benzotriazole, 2-(3',5'-di-t-butyl-2-hydroxyphenyl)-5-chlorobenzotriazole, a mixture of 2-(3'-dodecyl-2'-hydroxy-5'-methylphenyl)benzotriazole and 2-[3'-t-butyl-2'-hydroxy-5'-(2-isooctyloxycarbonylethyl)phenyl]benzotriazole, 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl)phenol], a condensate of poly(3-11)(ethylene glycol) and 2-[3'-t-butyl-2'-hydroxy-5'-(2-methoxycarbonylethyl)phenyl]benzotriazole, a condensate of poly(3-11)(ethylene glycol) and methyl 3-[3-(2H-benzotriazol-2-yl)-5-t-butyl-4-hydroxyphenyl]propionate, 2-ethylhexyl 3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxy-phenyl]propionic acid, and a mixture thereof.

The ultraviolet absorbers such as those mentioned above can be used singly or as a combination of two or more of them.

Examples of the Photo Stabilizer Include (1) hindered amine photo stabilizers such as bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl) 2-(3,5-di-t-butyl-4-hydroxybenzyl)-2-butylmalonate, bis(1-acrolyl-2,2,6,6-tetramethyl-4-piperidyl)2,2-bis(3,5-di-t-butyl-4-hydroxybenzyl)-2-butylmalonate, bis(1,2,2,6,6-pentamethyl-4-piperidyl decanedioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propionamide, tetarkis(2,2,6,6-tetramethyl-4-piperidyl)1,2,3,4-butaneteracarboxylate, tetrakis(1,2,2,6,6-pentamethyl-4-piperidyl)1,2,3,4-butantetracarboxylate, a mixed esterified product of 1,2,3,4-butanetetracarboxylic acid and 1,2,2,6,6-pentamethyl-4-piperidinol and 1-tridecanol, a mixed esterified product of 1,2,3,4-butanetetracarboxylic acid and 2,2,6,6-tetramethyl-4-piperidinol and 1-tridecanol, a mixed esterified product of 1,2,3,4-butanetetracarboxylic acid and 1,2,2,6,6-pentamethyl-4-piperidinol and 3,9-bis(2-hydroxy-1,1-dimethylethyl)-2,4,8,10-tetraoxaspiro[5.5]undecane, a mixed esterified product of 1,2,3,4-butanetetracarboxylic acid and 2,2,6,6-tetramethyl-4-piperidinol and 3,9-bis(2-hydroxy-1,1-dimethylethyl)-2,4,8,10-tetraoxaspiro[5.5]undecane, a polycondensate of dimethyl succinate and 1-(2-hydroxyethyl)-4-hydroxy-2,2,6,6-tetramethylpiperidine, poly[(6-morpholino-1,3,5-triazin-2,4-diyl)((2,2,6,6-tetramethyl-4-piperidyl)imino)hexamethylene((2,2,6,6-tetramethyl-4-piperidyl)imino)], poly[(6-(1,3,3-tetramethylbutyl)imino-1,3,5-triazin-2,4-diyl)((2,2,6,6-tetramethyl-4-piperidyl)imino)hexamethylene((2,2,6,6-tetramethyl-4-peperidyl)imino)], a polycondensate of N,N'-bis(2,2,6,6-tetramethyl-4-piperidyl)hexamethylenediamine and 1,2-dibromoethane, N,N',4,7-tetrakis[4,6-bis(N-butyl-N-(2,2,6,6-tetramethyl-4-piperidyl)-amino)-1,3,5-triazin-2-yl]-4,7-diazadecane-1,10 diamine, N,N',4-tris[4,6-bis(N-butyl-N-(2,2,6,6-tetramethyl-4-piperidyl)amino)-1,3,5-triazin-2-yl]-4,7-diazadecane-1,10 diamine, N,N',4,7-tetrakis[4,6-bis(N-butyl-N-(1,2,2,6,6-pentamethyl-4-piperidyl)amino)-1,3,5-triazin-2-yl]-4,7-diazadecane-1,10diamine, N,N',4-tris[4,6-bis(N-butyl-N-(1,2,2,6,6-pentamethyl-4-piperidyl)amino)-1,3,5-triazin-2-yl]-4,7-diazadecane-1,10-diamine, and a mixture thereof;

(2) acrylate photostabilizers such as ethyl α-cyano-β,β-diphenylacrylate, isooctyl α-cyano-β,β-diphenylacrylate, methyl α-carbomethoxycinnamate, methyl α-cyano-β-methyl-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline and a mixture thereof;

(3) nickel photostabilizers such as nickel complex of 2,2'-thiobis-[4-(1,1,3,3-tetramethylbutyl)phenol], nickel dibutyldithiocarbamate, nickel salt of monoalkyl ester, nickel complex of ketoxime and a mixture thereof;

(4) oxamide photostabilizers such as 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and a mixture thereof; and (5) 2-(2-hydroxyphenyl)-1,3,5-triazine photostabilizers such as 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2, 4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(4-methylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxypropoxy)phenyl]4,6-bis(2,4-dimethylphenyl)-1,3,5-triazine and a mixture thereof.

Examples of the hydroxylamine include, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N,N-dibenzylhydroxylamine, N,N-dibenzylhydroxylamine, N-hexadecyl-N-octadecylhydroxylamine, N-heptadecyl-N-octadecylhydroxylamine and a mixture thereof.

Examples of the metal inactivating agent include, for example, N,N'-diphenyloxamide, N-salicylal-N'-salicyloylhydrazine, N,N'-bis(salicyloyl)hydrazine, N,N'-bis(3,5-di-t-butyl-4-hydroxyphenylpropionyl)hydrazine, 3-salicyloylamino-1,2,4-triazole, bis(benzylidene)oxalyl dihydrazide, oxalinide, isophthaloyl dihydrazide, sebacoyl-bisphenyl hydrazide, N,N'-bis(salicyloyl)thiopropionyl dihydrazide and a mixture thereof.

Examples of the lubricant include, for example, an aliphatic hydrocarbon such as paraffin or wax, higher aliphatic acid having 8 to 22 carbon atoms, higher aliphatic acid (having 8 to 22 carbon atoms) metal (Al, Ca, Mg, Zn) salt, aliphatic alcohol having 8 to 22 carbon atoms, polyglycol, ester of higher fatty acid having 4 to 22 carbon atoms and aliphatic monohydric alcohol having 4 to 18 carbon atoms, higher aliphatic amide having 8 to 22 carbon atoms, silicone oil, rosin derivative and the like.

The polybutadiene composition of the present invention can be produced, for example, by melt-kneading the polybutadiene type polymer and the compound (I-1), compound (I-2), compound (II) or the benzoin compound. More specifically, it can be produced by adding any one of the compounds as listed above to the melt-kneaded polybutadiene type polymer, followed by further melt-kneading, thereby the compound is uniformly dispersed in the polybutadiene composition, or by blending the polybutadiene type polymer and the compound and optionally further additives to obtain a composition, met-kneading the same and extruding the melted composition. Alternatively, the compound can be added while the polymerization reaction for producing the polybutadiene type polymer is under progress or immediately after the end of the polymerization reaction. The compound may be added as a solid state or as a solution of the compound in a solvent.

When an antioxidant and/or another additive are added to the composition, the compound may also be added at the same time. When they are added at the same time, the compound may be dissolved in a heat-melted antioxidant and/or other additive. If the antioxidant and/or other additive are in liquid state, the compound may be dissolved or dispersed in them.

The present composition thus produced is typically melted at 150° C. or higher, preferably 170° C. or higher. The upper limit of the temperature is set within such a temperature range where decomposition of the polybutadiene polymer and the compound does not occur, and is typically 250° C. or lower, preferably 220° C. or lower.

Production of the molded articles from the composition of the present invention can be accomplished by a conventional method such as injection molding, extruding molding, blow molding or the like.

The appearances of the articles molded from the present polybutadiene composition such as hoses, footwear, toys, films and various vessels produced by various molding methods such as injection molding, extruding, blow molding or the like, is improved.

The present invention will be explained in more detail with the following examples, which should not be construed to limit the scope of the invention.

EXAMPLES 1

To 100 parts by weight of styrene-butadiene block copolymer powder [styrene-unit content: 75 wt %, butadiene-unit content: 25 wt %, clear pale yellow, manufactured by Philipps Company, Limited under the trade name "K-Resin KR-051"], is added 0.1 part by weight of 2-chromanone (powder), and the resulting mixture was melt kneaded at 200° C. for 2 minutes with 30 mmφ mono-axial extruder to obtain pelletized styrene-butadiene copolymer composition. The melt flow rate, MFR of the palletized composition was measured with a melt-indexer (L246-2531) at 260° C., residence time being 15 minutes and the load being 2160 g and found to be 33 g/10 min. The greater the MFR value, the more fluid the composition is and the less the gel is formed.

The obtained pellets are melt kneaded and injection molded to produce an article with good appearance and no gel product.

EXAMPLE 2

Styrene-butadiene copolymer was obtained by conducting an experiment in a similar manner as in Example 1, except that 0.1 part by weight of 2-phenyl-4-chromanone (powder) was used in place of 2-chromanone. MFR of the obtained composition was measured in a similar manner as in Example 1 and found to be 27 g/10 min.

The pellets obtained as above is melt-kneaded and injection-molded to produce an article with good appearance and having little gel product.

COMPARATIVE EXAMPLE 1

Pellets of the styrene-butadiene block copolymer was obtained in a similar manner as in Example 1 except that 2-chromanone was not used. MFR of the pellets was measured with the melt-indexer (L246-2531) as used above at 260° C., the residence time 15 minutes and the load being 2160 g, and found to be 4 g/10 min. The melt flow rate means that gel products are formed. The obtained pellets are melt-kneaded and injection-molded to give a molded article with many gel products and minute convex portions are formed. The results are shown in Table 1.

TABLE 1

|  | 2-chromanone* | 2-phenyl-4-chromanone* | MFR (g/10 min) |
| --- | --- | --- | --- |
| Ex. 1 | 0.1 | — | 33 |
| Ex. 2 | — | 0.1 | 27 |
| Comparative 1 | — | — | 4 |

*Amounts parts by weight per 100 parts by weight of Styrene-butadiene block copolymer.

EXAMPLES 3

To 100 parts by weight of styrene-butadiene block copolymer powder [styrene-unit content: 75 wt %, butadiene-unit content: 25 wt %, clear pale yellow, manufactured by Philipps company, Limited under the trade name "K-Resin KR-051"], is added 0.1 part by weight of 2,2,5, 7,8-pentamethyl-6-hydroxycouromane (powder), and the resulting mixture was melt kneaded at 200° C. for 2 minutes with 30 mmφ mono-axial extruder to obtain pelletized styrene-butadiene copolymer composition. The melt flow rate, MFR of the palletized composition was measured with a melt-indexer(L246-2531) at 260° C., residence time being 15 minutes and the load being 2160 g and found to be 29 g/10 min. The greater the MFR value, the more fluid the composition is and the less the gel is formed.

The obtained pellets are melt kneaded and injection molded to produce an article with good appearance and no gel product.

EXAMPLE 4

Styrene-butadiene copolymer was obtained by conducting an experiment in a similar manner as in Example 3, except that 0.1 part by weight of 2,2,5,7,8-pentamethylcouromane (powder) was used in place of 2,2,5,7,8-pentamethyl-6-hydroxycouromane. MFR of the obtained composition was measured in a similar manner as in Example 1 and found to be 31 g/10 min.

The pellets obtained as above is melt-kneaded and injection-molded to produce an article with good appearance and having little gel product. The results are shown in Table 2.

TABLE 2

| | 2,2,5,7,8-penta-methyl-6-hydroxy-chromane* | 2,2,5,7,8-penta-methylchromane* | MFR (g/10 min) |
|---|---|---|---|
| Ex. 3 | 0.1 | — | 29 |
| Ex. 4 | — | 0.1 | 31 |
| Comparative 1 | — | — | 4 |

*Amounts parts by weight per 100 parts by weight of the styrene-butadiene block copolymer.

EXAMPLE 5

To 100 parts by weight of styrene-butadiene block copolymer powder [styrene-unit content: 75 wt %, butadiene-unit content: 25 wt %, clear pale yellow, manufactured by Philipps Company, Limited under the trade name "K-Resin KR-051"], is added 0.1 part by weight of benzoin (powder), and the resulting mixture was melt kneaded at 200° C. for 2 minutes with 30 mmφ mono-axial extruder to obtain pelletized styrene-butadiene copolymer composition. The melt flow rate, MFR of the palletized composition was measured with a melt-indexer(L246-2531) at 260° C., residence time being 15 minutes and the load being 2160 g and found to be 38 g/10 min. The greater the MFR value, the more fluid the composition is and the less the gel is formed.

The obtained pellets are melt kneaded and injection molded to produce an article with good appearance and no gel product. The results are shown in Table 3.

TABLE 3

| | Benzoin* | MFR (g/10 min) |
|---|---|---|
| Ex.5 | 0.1 | 38 |
| Comparative 1 | — | 4 |

*Amounts parts by weight per 100 parts by weight of Styrene-butadiene block copolymer.

What is claimed is:
1. A polybutadiene composition comprising:

(a) (a-1) a polybutadiene type polymer, and (a-2) at least one compound selected from a compound of formula (I-1):

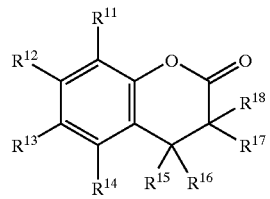

or a compound of formula (I-2):

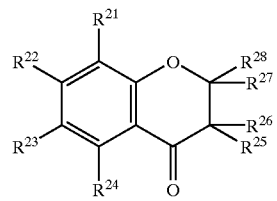

wherein $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, and $R^{28}$ are the same or different and independently represent a hydrogen atom, an alkyl group, an alkoxy group, a benzyloxy group, a hydroxy group, a carboxyl group, an acyl group, an acyloxy group, an alkoxycarbonyl group, or a benzyloxycarbonyl group;

(b) (b-1) a polybutadiene type polymer, and (b-2) a compound of formula (II):

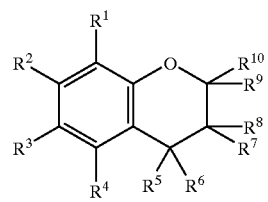

wherein $R^1$, $R^2$ and $R^4$ independently represent a hydrogen atom, or an alkyl group, $R^3$ represents a hydrogen atom, an alkyl group, an alkoxy group, a hydroxy group, or an acetyl group, $R^5$, $R^6$, $R^7$, and $R^8$ independently represent a hydrogen atom, an alkyl group, or a phenyl group which may be substituted with an alkyl group, and $R^9$ and $R^{10}$ independently represent a hydrogen atom, an alkyl group, or an alkenyl group; or (c) (c-1) a styrene-butadiene copolymer, and (c-2) a benzoin compound; and wherein the polybutadiene type polymer in (b) is polybutadiene polymer, styrene-butadiene copolymer, acrylonitrile-butadiene copolymer, or styrene-butadiene block copolymer.

2. A polybutadiene composition according to claim 1, which composition comprises (a-1) a polybutadiene type polymer, and (a-2) at least one compound selected from a compound of formula (I-1):

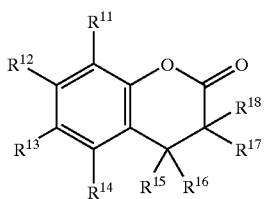

or a compound of formula (I-2):

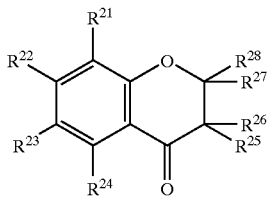

wherein $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, and $R^{28}$ are the same or different and independently represent a hydrogen atom, an alkyl group, an alkoxy group, a benzyloxy group, a hydroxy group, a carboxyl group, an acyl group, an acyloxy group, an alkoxycarbonyl group, or a benzyloxycarbonyl group.

3. A polybutadiene composition according to claim 1, which comprises
(b-1) a polybutadiene type polymer, and
(b-2) a compound of formula (II):

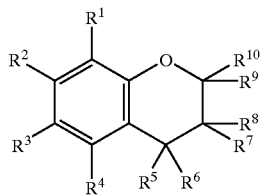

wherein $R^1$, $R^2$ and $R^4$ independently represent a hydrogen atom, or an alkyl group, $R^3$ represents a hydrogen atom, an alkyl group, an alkoxy group, a hydroxy group, or an acetyl group, $R^5$, $R^6$, $R^7$, and $R^8$ independently represent a hydrogen atom, an alkyl group, or a phenyl group which may be substituted with an alkyl group, and $R^9$ and $R^{10}$ independently represent a hydrogen atom, an alkyl group, or an alkenyl group.

4. A polybutadiene composition according to claim 1, which composition comprises
(c-1) a styrene-butadiene copolymer, and
(c-2) a benzoin compound.

5. A polybutadiene composition according to claim 1, 2 or 3, wherein the polybutadiene type polymer in (a) is polybutadiene polymer, styrene-butadiene copolymer, acrylonitrile-butadiene copolymer, acrylonitrile-butadiene-styrene copolymer, styrene-butadiene block copolymer or high-impact polystyrene.

6. A polybutadiene composition according to claim 5, wherein the polybutadiene type polymer in (a) is polybutadiene polymer, styrene-butadiene copolymer, acrylonitrile-butadiene copolymer, or styrene-butadiene block copolymer.

7. A polybutadiene composition according to claim 1 or 4, wherein the benzoin compound is a compound of formula (III):

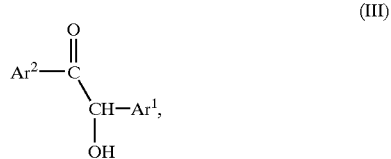

wherein $Ar^1$ and $Ar^2$ independently represent a phenyl group, which may be substituted with at least one group selected from the group consisting of a halogen atom, a hydroxy group, an alkyl group, an alkoxy group, an alkoxyalkyl group, an aryl group, an arylalkyl group, an aryloxy group, an alkylcarbonyloxy group, an alkylsulfonyloxy group, an arylcarbonyloxy group, and a group of formula: —COOQ, wherein Q represents a hydrogen atom or an alkyl group, and two adjacent substituent groups on the phenyl group together with the carbon atoms to which they are bonded may form a benzene ring or rings.

8. A polybutadiene composition according to claim 1 or 4, wherein $Ar^1$ and $Ar^2$ independently represent a phenyl group, which may be substituted with an alkyl group, an alkoxy group or an alkoxyalkyl group.

9. A polybutadiene composition according to any one of claims 1 to 8, which comprises an effective amount for preventing formulation of gelled product of the compound of formula as defined in (a-2), (b-2) or (c-2) respectively in the polybutadiene composition (a), (b) or (c).

10. A polybutadiene composition according to claim 1, 2, 5 or 6, wherein an amount of at least one compound selected from the compound of formula (I-2) or (I-2) is 0.001 part by weight or more per 100 parts by weight of the polybutadiene type polymer.

11. A polybutadiene composition according to claim 1, 3, 5, or 6, wherein an amount of the compound of formula (II) is 0.001 part by weight or more per 100 parts by weight of the polybutadiene type polymer.

12. A polybutadiene composition according to claim 1, 4, 7 or 8, wherein an amount of the benzoin compound is 0.01 part by weight or more per 100 parts by weight of the styrene-butadiene copolymer.

13. A polybutadiene composition according to claim 1, 4, 7, 8 or 12, wherein the benzoin compound is benzoin.

14. A polybutadiene composition according to claim 1, 4, 7, 8, 12, or 13, wherein the styrene-butadiene copolymer is a styrene-butadiene block copolymer.

15. An article molded from the composition of any one of claims 1 to 14.

16. A process for producing a polybutadiene composition, which comprises: i) blending
(a) (a-1) a polybutadiene type polymer, and
(a-2) at least one compound selected from a compound of formula (I-1):

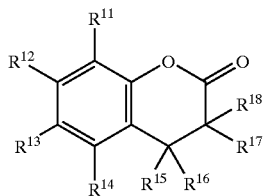

or a compound of formula (I-2):

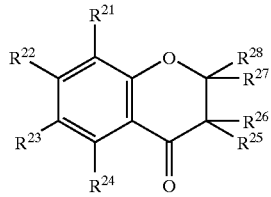

wherein $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, and $R^{28}$ are the same or different and independently represent a hydrogen atom, an alkyl group, an alkoxy group, a benzyloxy group, a hydroxy group, a carboxyl group, an acyl group, an acyloxy group, an alkoxycarbonyl group, or a benzyloxycarbonyl group;

(b) (b-1) a polybutadiene type polymer, and
(b-2) a compound of formula (II):

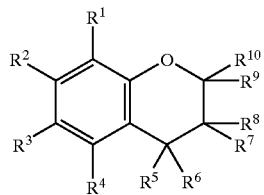

wherein $R^1$, $R^2$ and $R^4$ independently represent a hydrogen atom, or an alkyl group, $R^3$ represents a hydrogen atom, an alkyl group, an alkoxy group, a hydroxy group, or an acetyl group, $R^5$, $R^6$, $R^7$, and $R^8$ independently represent a hydrogen atom, an alkyl group, or a phenyl group which may be substituted with an alkyl group, and $R^9$ and $R^{10}$ independently represent a hydrogen atom, an alkyl group, or an alkenyl group; or (c) (c-1) a styrene-butadiene copolymer, and
(c-2) a benzoin compound;
ii) melting the blended composition; and
iii) extruding the melted composition.

17. A process for producing a molded article, which comprises melting a polybutadiene composition comprising:
(a) (a-1) a polybutadiene type polymer, and
(a-2) at least one compound selected from a compound of formula (I-1):

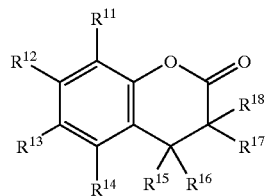

or a compound of formula (I-2):

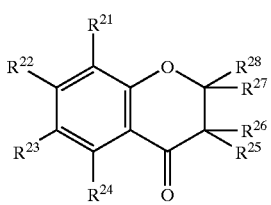

wherein $R^{11}$, $R^{12}$, $R^{13}$, $R^{14}$, $R^{15}$, $R^{16}$, $R^{17}$, $R^{18}$, $R^{21}$, $R^{22}$, $R^{23}$, $R^{24}$, $R^{25}$, $R^{26}$, $R^{27}$, and $R^{28}$ are the same or different and independently represent a hydrogen atom, an alkyl group, an alkoxy group, a benzyloxy group, a hydroxy group, a carboxyl group, an acyl group, an acyloxy group, an alkoxycarbonyl group, or a benzyloxycarbonyl group;

(b) (b-1) a polybutadiene type polymer, and
(b-2) a compound of formula (II):

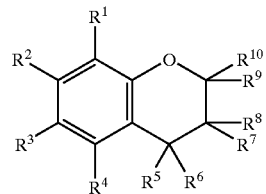

wherein $R^1$, $R^2$ and $R^4$ independently represent a hydrogen atom, or an alkyl group, $R^3$ represents a hydrogen atom, an alkyl group, an alkoxy group, a hydroxy group, or an acetyl group, $R^5$, $R^6$, $R^7$, and $R^8$ independently represent a hydrogen atom, an alkyl group, or a phenyl group which may be substituted with an alkyl group, and $R^9$ and $R^{10}$ independently represent a hydrogen atom, an alkyl group, or an alkenyl group; or (c) (c-1) a styrene-butadiene copolymer, and
(c-2) a benzoin compound, and subjecting the melted composition to injection molding, extruding, or blow molding.

* * * * *